US005537540A

United States Patent [19]

Miller et al.

[11] Patent Number: 5,537,540
[45] Date of Patent: Jul. 16, 1996

[54] TRANSPARENT, SECURE COMPUTER VIRUS DETECTION METHOD AND APPARATUS

[75] Inventors: Craig A. Miller, Tomball, Tex.; Yatin Dhareshwar, Bombay, Ind.; Edmund G. Heller, Spring; Michael R. Garrett, Houston, both of Tex.

[73] Assignee: Compaq Computer Corporation, Houston, Tex.

[21] Appl. No.: 315,702

[22] Filed: Sep. 30, 1994

[51] Int. Cl.$^6$ ...................................................... G06F 11/00
[52] U.S. Cl. ............................... 395/183.14; 395/185.05; 395/183.12
[58] Field of Search ............................ 395/575, 700, 395/750, 425, 183.14, 183.13, 183.15, 183.21, 183.12, 184.01, 185.05, 47; 380/4

[56] References Cited

U.S. PATENT DOCUMENTS

| | | | |
|---|---|---|---|
| 4,309,569 | 1/1982 | Merkle | 178/22.08 |
| 4,819,267 | 4/1989 | Cargile et al. | 380/23 |
| 4,908,861 | 3/1990 | Brachtl et al. | 380/25 |
| 5,022,077 | 6/1991 | Bealkowski et al. | 380/4 |
| 5,050,212 | 9/1991 | Dyson | 380/25 |
| 5,073,934 | 12/1991 | Matyas et al. | 380/30 |
| 5,121,345 | 6/1992 | Lentz | 364/550 |
| 5,144,659 | 9/1992 | Jones | 380/4 |
| 5,204,966 | 4/1993 | Wittenberg et al. | 395/800 |
| 5,265,164 | 11/1993 | Matyas et al. | 380/30 |
| 5,375,243 | 12/1994 | Parvych et al. | 395/725 |
| 5,379,342 | 1/1995 | Arnold et al. | 380/2 |
| 5,421,006 | 5/1995 | Jablon et al. | 395/575 |

*Primary Examiner*—Robert W. Beausoliel, Jr.
*Assistant Examiner*—Joseph E. Palys
*Attorney, Agent, or Firm*—Pravel, Hewitt, Kimball & Krieger

[57] ABSTRACT

A computer system which verifies the integrity of installed software on the computer system. A reserved non-DOS hard disk partition is used to store routines which pre-boot the computer system and provide a secure environment from which to verify files. Routines start by performing a self check on the non-DOS partition routines, then check the master boot record and boot sectors of the hard disk. System files of the user DOS partition are verified next and any additional designated user files are verified until the computer system is verified. Since the computer booted from an atypical partition, the drives are remapped to account for the shift in logical disk drive addressing. When completed and prior to booting from the user partition, an NVRAM latch is set to prevent unauthorized modification of the initial checksums. The non-DOS partition contains three different sets of DOS: a copy of the user DOS, if DOS is installed on the user partition; a subset of DOS and a backup of the DOS subset. This allows the non-DOS partition to be booted to allow easier execution of the routines. Additionally, if the user changes DOS versions, such changes can be provided to the non-DOS partition for future use.

14 Claims, 13 Drawing Sheets

TRANSPARENT, SECURE COMPUTER VIRUS DETECTION METHOD AND APPARATUS

BACKGROUND OF THE INVENTION

1. Field of the Invention

This invention relates to an apparatus and method of verifying the integrity of computer data for effects of computer viruses and more particularly to a verification system using a reserved non-DOS hard disk partition resulting in a boot verification system that is independent of and transparent to the operating system.

2. Description of the Related Art

A personal computer (PC) typically contains several forms of storage media such as a hard disk and a floppy disk. These types of media are used to store user software such as the operating system (OS) and applications, and work product information such as electronic documents. A PC also has lower level software known as the Basic Input/Output System (BIOS) contained in Read Only Memory (ROM) on the system board. When the computer is first turned, on the CPU starts executing the BIOS from ROM. The BIOS performs a set of diagnostic routines called Power On Self Test (POST) and if completed successfully, proceeds to locate and boot up the OS.

The BIOS is programmed to locate the operating system by first searching the floppy disk, and then the hard disk. This permits the PC to be booted if either the hard disk has failed or a different OS is required.

Before continuing, background on hard disk drives is deemed appropriate. A computer may have a plurality of hard disks connected to allow storage of large amounts of software and data. Physically, a hard disk is comprised of at least one platter for storing the data. Each platter is divided into a number of concentric storage units called tracks. A track is further divided into sectors. Each platter is accessed by a top head and a bottom head which read and write data onto the hard disk. Logically, a hard disk may be divided into partitions, each partition having an amount of storage selectable at the time of creation, but the aggregate of all partitions not exceeding the storage capacity of the hard disk. For example, a single hard disk could have three partitions logically named C:, D: and E:. Partitions are further divisible into tracks, cylinders and sectors for addressing purposes. Under DOS, a computer may have several disk partitions of different sizes or different types, meaning DOS-type or non-DOS-type, thus allowing more than one operating system to be installed on the same hard disk. Additional disk partition types are reserved for future uses. Each hard disk has a single Master Boot Record (MBR), that contains information pertaining to the size, type and location of disk partitions. A boot record is contained in the boot sector of the bootable partition which contains operating system dependent information relating to the file structure on the hard disk.

Returning now to the boot sequence, once the MBR is found, control is handed to the first byte of the MBR, thus booting the OS.

As mentioned before, most information contained in a computer is stored on the hard disk. Unless otherwise noted, "software" and "program" refers to executable software programs while "data" refers generically to all forms of electronic information including software and files created by software. But in either case, all are stored on the hard disk. Huge amounts of money are invested by companies in purchasing software and even more money is expended on developing the information contained in the electronic data files such as documents, spreadsheets and drawings. Protecting these resources is therefore an important concern.

One method of offering protection is by the use of passwords. The password is typically stored in battery-backed CMOS memory and before the user is allowed access to the computer, the user is required to enter a password. Once entered, the computer compares the entered password to the password in CMOS and, if they match, is allowed access. The main disadvantage with this system is that passwords offer very little protection against certain forms of data corruption, discussed below. Second, other forms of attack can bypass the CMOS memory because it is not read protected in many cases. To address this concern, passwords are encoded, however, once the encoding scheme is reverse engineered the protection has again been breached. Further, the CMOS memory could simply be disconnected from its battery, thus losing any contents including the password and allowing access.

A related art to that of computer protection is that of integrity checking. Integrity checking is used here to denote methods used to check the trustworthiness of data. It should be noted that in this context, integrity and trustworthiness have little to do with defects in the design of the software, or bugs in the software, although certain bugs could cause the integrity of the software to be jeopardized. The two main causes of software untrustworthiness are file corruption and viruses. File corruption usually happens when some sort of system failure occurs during a file transfer for example, if the system is shut off while a file is being copied onto the hard disk. The other much larger threat to software integrity is computer viruses.

While many computer viruses are relatively benign, computer viruses can be hostile, clandestine and created specifically to cause undesirable results on the computer, such as destroy software and data, or cause peculiar computer operation, such as lock-up the keyboard or blank the monitor. They can be introduced into a computer in as many ways as the computer can communicate externally, such as through the floppy drive, a network or a modem. Viruses are typically designed to secretly attach themselves to a file or the MBR or boot record so the user is unaware of the intrusion. The distinguishing feature is that once they attach themselves to the host program, the file must be different. Once attached, any subsequent copies of that host file also contain the virus, thereby increasing the potential for destruction. The virus is then activated when the file is executed. Thus a virus attached to a data file will lay dormant because the data file is not executable.

Certain methods of calculating assessment codes are well suited to detecting the modification of data caused by viruses or accidentally corrupted files. Checksums are adequate for detecting accidental modifications of data, however, they are an insecure defense against viruses. A well-designed virus could easily attach itself to a host program without resulting in a different checksum. Therefore, to address this problem, advanced modification detection codes (MDCs) have been developed to specifically detect deliberate corruption of data, and are superior to checksums. For this purpose, software is assumed trustworthy when it is initially installed onto the fixed disk of the computer. Once installed, an integrity assessment code is calculated and stored. Thereafter, when the computer is turned on again, the stored assessment code is compared to a newly calculated value. If a discrepancy is found, the user is alerted. The disadvantage with this method is that because of the unlimited number of hard disk files, i.e. assessment codes, the assessment codes must be stored on the hard disk thus making the codes themselves susceptible to virus attack.

Modification detection codes are also commonly used in conjunction with the use of digital signatures, which can authenticate the originator of a message. Applied to integrity assessment, an originating program would hold the signature, or MDC, of the data it is assessing. This way the originating program "signs off" on the integrity of the assessed data before it is used.

One common commercial method of assessing the integrity of the user software is to check for viruses by running a virus checking software program. These programs rely on the characteristics of the known viruses to detect their presence. Thus, a new virus would be undetectable to a program like this. Additionally, if a virus is present, the virus checking software itself is susceptible because it is loaded from the infected hard disk and must run in memory that could be infected.

Another improved software method moves the software checking software onto a ROM. When the BIOS boots, the virus checking ROM software is executed. This has the advantage of checking early enough in the boot process so that any viruses in the system can be detected before they have the chance to be loaded into memory. However, the ROM code still relies on the known characteristics of the viruses to detect their presence. Modification detection codes are also used with this technique, but again, the assessment codes are accessible to savvy viruses.

A much more secure technique is described in U.S. patent application Ser. No. 08/231,443, filed Apr. 20, 1994, to David C. Jablon and Nora Hensley, entitled "Method and Apparatus for Assessing Integrity of Computer Software", which is hereby incorporated by reference. The described technique uses CMOS memory as a non-volatile memory (NVRAM). The NVRAM has one location which can be write protected by a write once bit. Once set, the write protection cannot be removed until the computer is reset. This location holds an MDC code for certain operating system programs located on the hard disk. Software in the ROM BIOS needs the protected operating system programs and the MDC of those programs. If the calculated MDC matches that stored in the NVRAM, then the programs are secure and can be executed. In one embodiment for normal operation the write protection is activated at this time. In an alternative embodiment the write protection is activated before the first, non-checked program is executed. The operating system is then loaded and boots the computer, the operating system can then check each further file before it is executed on each file can check the files it initiates. Checking consists of calculating the MDC of the programs, comparing to a value in a previously checked table and passing the program if there is a good comparison. If not, the program has changed and may include a virus.

While the technique is very secure and usable in an ideal environment, a PC is far from an ideal environment. Files change often, in many cases those which are considered critical system files, so the problems of bookkeeping the changes and back calculating through the MDCs is problematic. Further, many PCS have very complicated booting procedures and the technique can interfere with those procedures. So while the technique is theoretically secure, in practice, the many variables of a PC environment limit its usefulness. So it would clearly be desirable to overcome the PC environment problems to utilize the technique to provide positive detection of viruses.

SUMMARY OF THE PRESENT INVENTION

A computer system according to the present invention verifies the integrity of installed software on the computer system. It uses the secure checking technique of the Jablon application in a PC environment without capability problems and greatly reduced administrative requirements. A reserved non-DOS hard disk partition is used to pre-boot the computer system and provide a secure environment from which to verify files. Upon power-up or reset, the computer performs the power on self test and calls the first SAFESTART routine. The SAFE START routines start by performing a self check, then check the master boot record and boot sectors of the hard disk. This verification captures a large majority of viruses and is performed before any code residing in those areas is executed, thus preventing the spread of any discovered viruses. Further checks are performed on SAFE START files before each is executed. Eventually, system files are verified and any additional designated user files are verified until the computer system is verified. Since the computer booted from an atypical partition, the drives are remapped to account for the shift in logical disk drive addressing. When completed, SAFE START files are cleaned up, a latch is set to prevent unauthorized modification of the initial protection values, and control is returned to the BIOS to boot the user OS.

The reserved non-DOS partition contains three different sets of DOS: a copy of the User DOS (if DOS is installed on the user partition), a subset of DOS called SDOS, and a backup of the DOS subset. According to the present invention, the reserved non-DOS partition is bootable by SAFE START. During SAFE START, the default OS is the user's DOS, if installed, otherwise SDOS is used as the pre-boot OS. Additionally, if one of the OS's becomes infected, another can be swapped in to run SAFE START.

BRIEF DESCRIPTION OF THE DRAWINGS

A better understanding of the invention can be obtained when the following detailed description of the preferred embodiment is considered in conjunction with the following drawing, in which.

DETAILED DESCRIPTION OF THE PREFERRED EMBODIMENT

Figure 1:
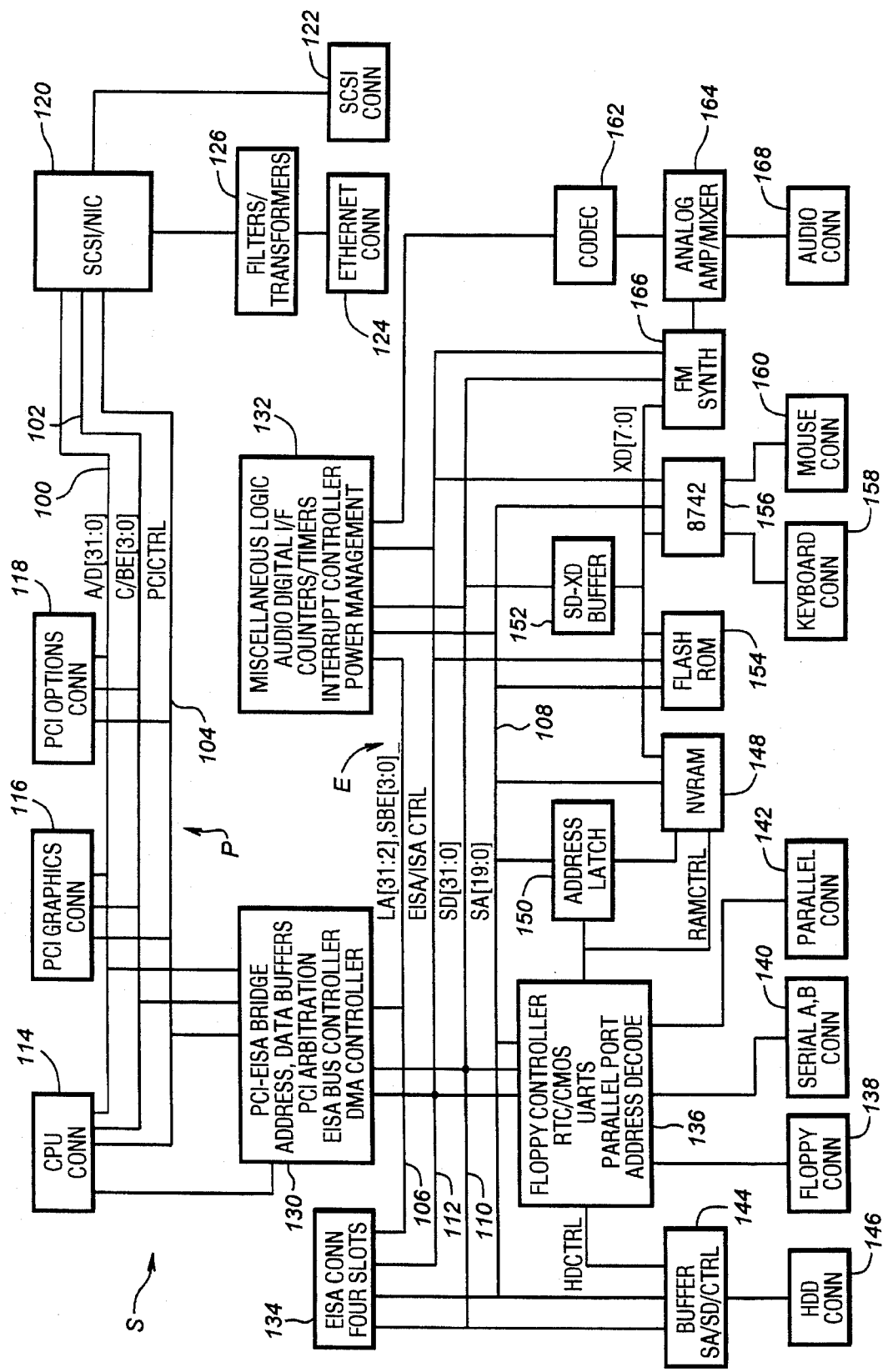
FIG. 1 is a schematic block diagram of a computer system board S.

Referring now to FIG. 1, the system board S of a computer system for use according to the present invention is shown. In the preferred embodiment, the system boards contain circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2:
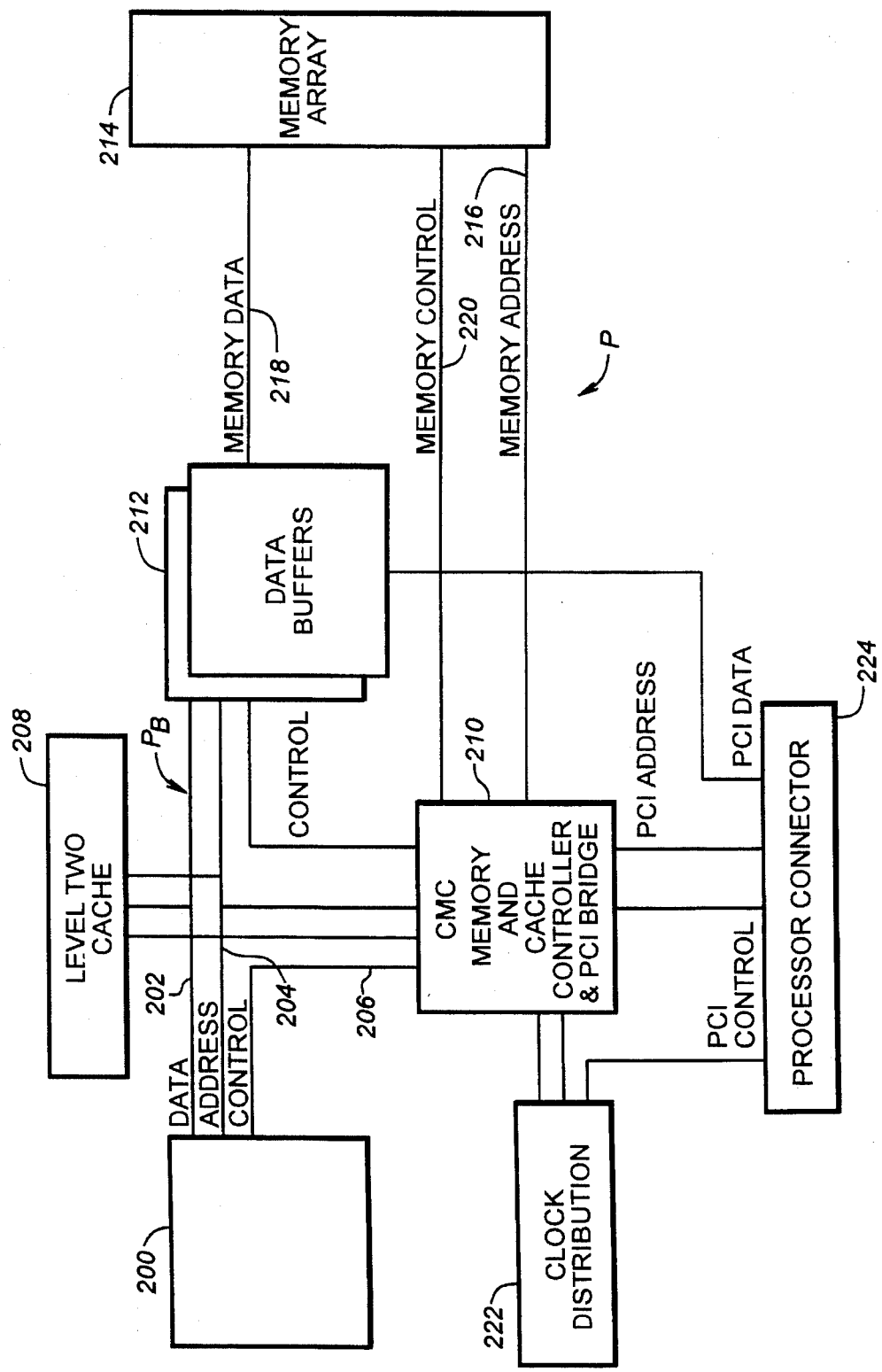
FIG. 2 is a schematic block diagram of a processor board P.
Figure 3:
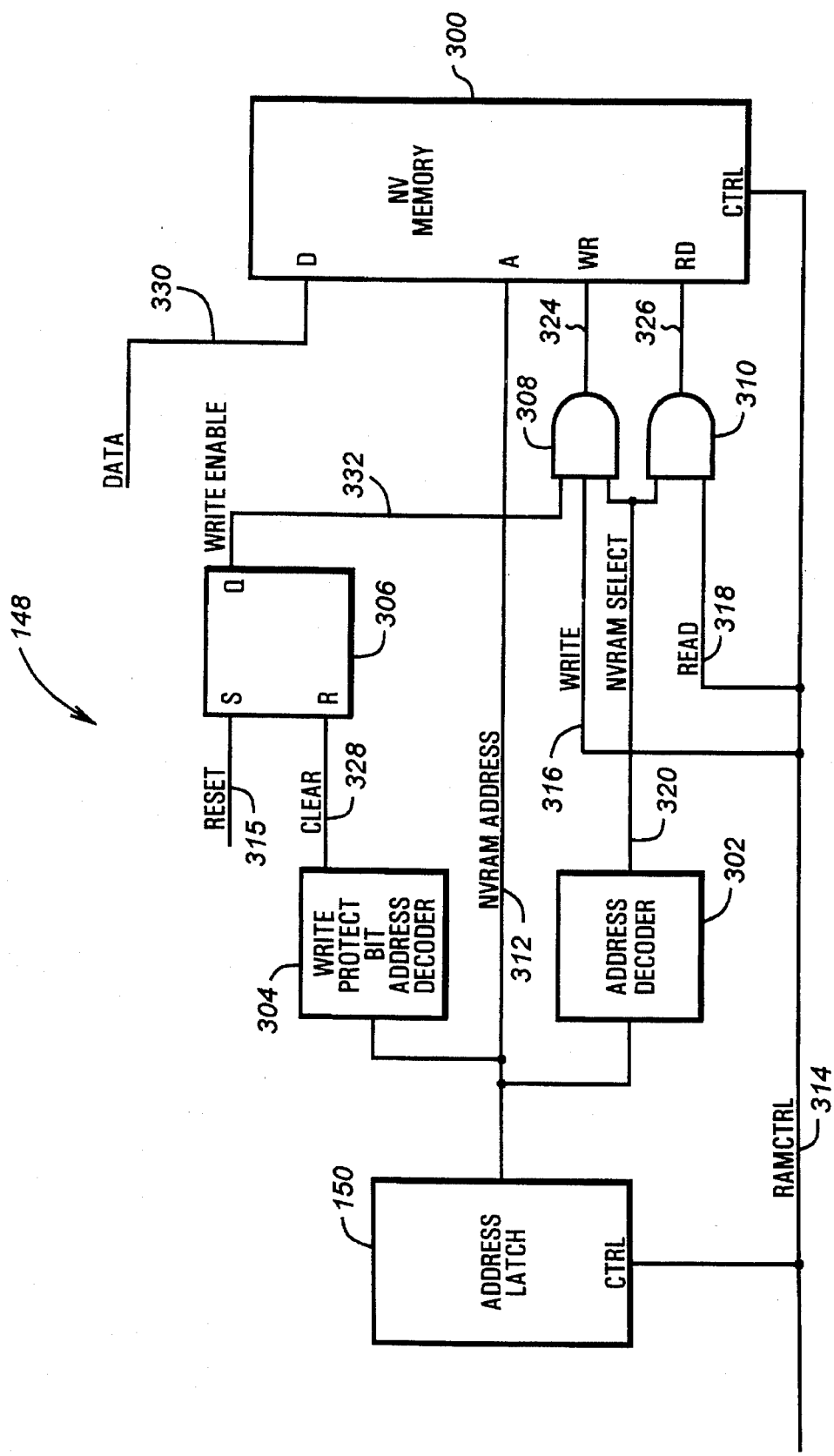
FIG. 3 is a more detailed block diagram of a portion of FIG. 1.

A CPU connector 114 is connected to the PCI bus P to receive interchangeable processor cards, such as the one shown in FIG. 2. A PCI graphics connector 116 is connected to the PCI bus P to receive a video graphics card as shown in FIG. 3. A PCI option connector 118 is also connected to the PCI bus P to receive any additional cards designed according to the PCI standard. In addition, a SCSI and network interface (NIC) controller 120 is connected to the PCI bus P. Preferably the controller 120 is a single integrated circuit and includes the capabilities necessary to act as a PCI bus master and slave and the circuitry to act as a SCSI controller and an Ethernet interface. A SCSI connector 122 is connected to the controller 120 to allow connection of various SCSI devices, such as hard disk drives and CD-ROM drives. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, and EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains a digital audio interface, counters and timers as conventionally present in personal computer systems, an interrupt controller for both the PCI and EISA buses P and E and power management logic, as well as other miscellaneous circuitry. A series of four EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A buffer 144 is connected to both the EISA bus E and the combination I/O chip 136 to act as a buffer between the EISA bus E and a hard disk drive connector 146 to allow connection of an IDE-type hard disk drive. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information. A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160.

The computer system of the preferred embodiment also includes audio capabilities. To this end a CODEC chip 162 is connected to the miscellaneous system logic chip 132 and to an analog amplifier and mixer chip 164. An FM synthesizer chip 166 is connected to the analog amplifier and mixer 164 and receives digital information from the XD bus. The FM synthesizer 166 is also connected to the control and data portions 110 and 112 of the EISA bus E and is controlled by the miscellaneous system logic chip 132. An audio connector 168 is provided to allow external audio connections to the computer and is connected to the outputs and inputs of the analog amplifier and mixer 164.

Referring now to FIG. 2, the processor board P is shown. In the processor board P of FIG. 2, the CPU or processor 200 can be any of a plurality of processors, such as the 486DX/33, 486DX2/66, 486DX4/50-100, 486DX4/33-100, 486DX4/33-83, P24T, Pentium 50/75, Pentium 60/90, and Pentium 66/100, and other similar and compatible processors. The processor 200 provides data, address and control portions 202, 204 and 206 to form a processor bus PB. A level 2 (L2) or external cache memory system 208 is connected to the processor bus PB to provide additional caching capabilities to improve performance of the computer system. The L2 cache 208 can be organized as a 128 kbyte direct mapped cache or 256 kbyte two-way set associative cache when used with 486 family processor and as a 256 or 512 kbyte direct mapped or two-way set associative cache when used with Pentium family processors. A cache and memory controller (CMC) and PCI bridge chip 210, is connected to the control portion 206 and to the address portion 204. The CMC 210 is connected to the L2 cache 208 as it incorporates the cache controller and therefore controls the operations of the cache memory devices in the L2 cache 208. The CMC 210 is also connected to control a series of address and data buffers 212. The data buffers 212 are utilized to handle memory data to a main memory array 214. The data buffers 212 are connected to the processor data portion 202 and receive control signals from the CMC 210. The data buffers 212 provide a memory address bus 216 and a memory data bus 218 to the memory array 214. A memory control signal bus 220 and memory address bus 216 is provided from the CMC 210. Clock distribution and generation circuitry 222 is associated with the processor card P and is connected to the CMC 210. A processor connector 224, such as a card edge, is provided to be mateably received by the processor connector 114. The processor connector 224 is connected to the CMC 210, the data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

The computer system elements that are not discussed in detail below are not significant to the present invention other than to illustrate an example of a fully figured computer system. It is noted that the above description of a computer system is provided for completeness and numerous variations could be developed as apparent to those skilled in the art.

Referring now to FIG. 3, a block diagram of portions of the NVRAM 148 is shown. An address latch 150 connects and provides NVRAM address signals 312 to the NV memory 300, an address decoder 302 and a write protect bit address decoder 304. Control signals to the NVRAM 148 are provided from the computer by RAMCTRL signals 314 which are connected to the address latch 150 and the NV memory 300 and include a read signal 318 connected to an AND gate 310 and a write signal 316 connected to an AND gate 308. An S/R latch 306 has an S input connected to the system reset signal 315, an R input connected to the output of the write protect bit address decoder 304 by a clear signal 328, and a Q output connected to the AND gate 308 by a write enable signal 322. The AND gate 308 is connected to the write input of the NV memory 300 by a signal 324. Upon system reset, the Q output of the S/R latch 306 is set high by the reset signal 315, thus allowing a write operation to NV memory 300. A subsequent write operation to the address decoded by the write protect bit address decoder 304 will cause the clear signal 328 to be driven high, thus resetting the S/R latch 306 and disabling further write operations to the NV memory 300. Read or write operations to the NV memory 300 are decoded by the address decoder 302 which provides an NVRAM select signal 320 to the inputs of the AND gate 308 and the AND gate 310. Data is communicated to the NV memory 300 by the data signals 330. The foregoing circuitry allows read and write accesses of the NV memory 300, however, once the right protect bit in the S/R latch 306 is cleared, no further write operations will be accepted by the NVRAM 148 until the computer system is reset or powered off again. Other variations in the development of the NVRAM can be utilized with appropriate modifications, as long as there is a way to protect a small area.

This completes the detailed description of the circuitry utilized in the computer system according to the present invention to provide a write protected memory area for the verification system of the present invention. This circuitry is used in conjunction with certain operating sequences provided in the read only memory space and hard disk of the computer system to perform the verification functions of the present invention.

Figure 4:
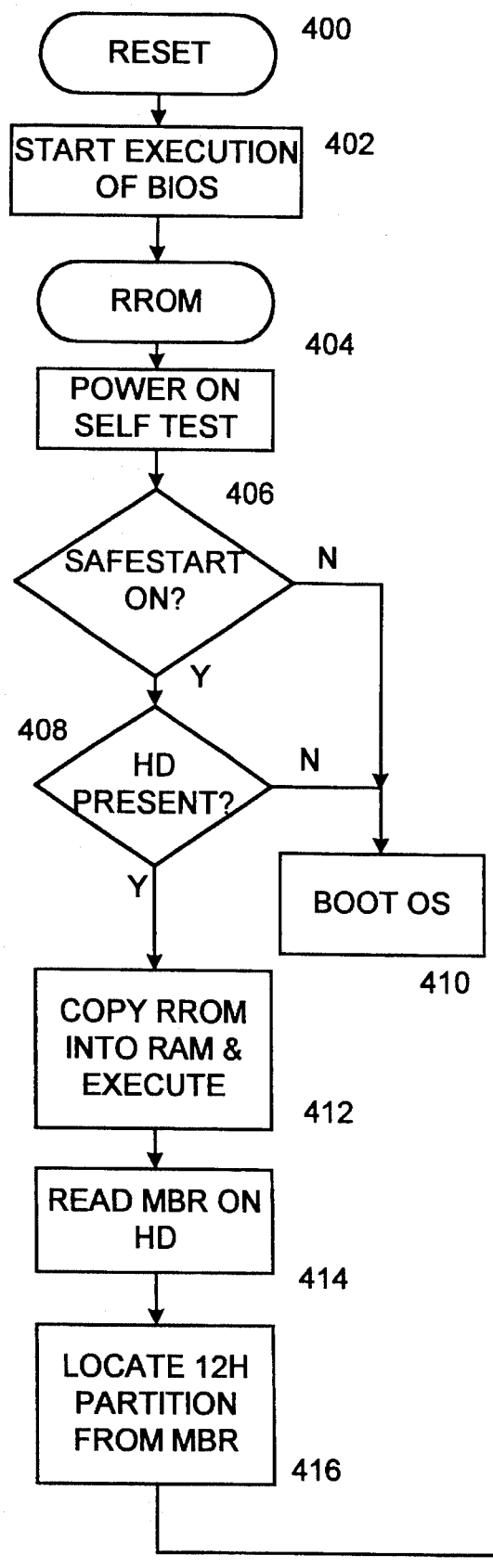
FIG. 4 is a flowchart illustrating sequences for preparing the computer system of FIGS. 1 and 2 for utilizing the present invention.
Figure 4:
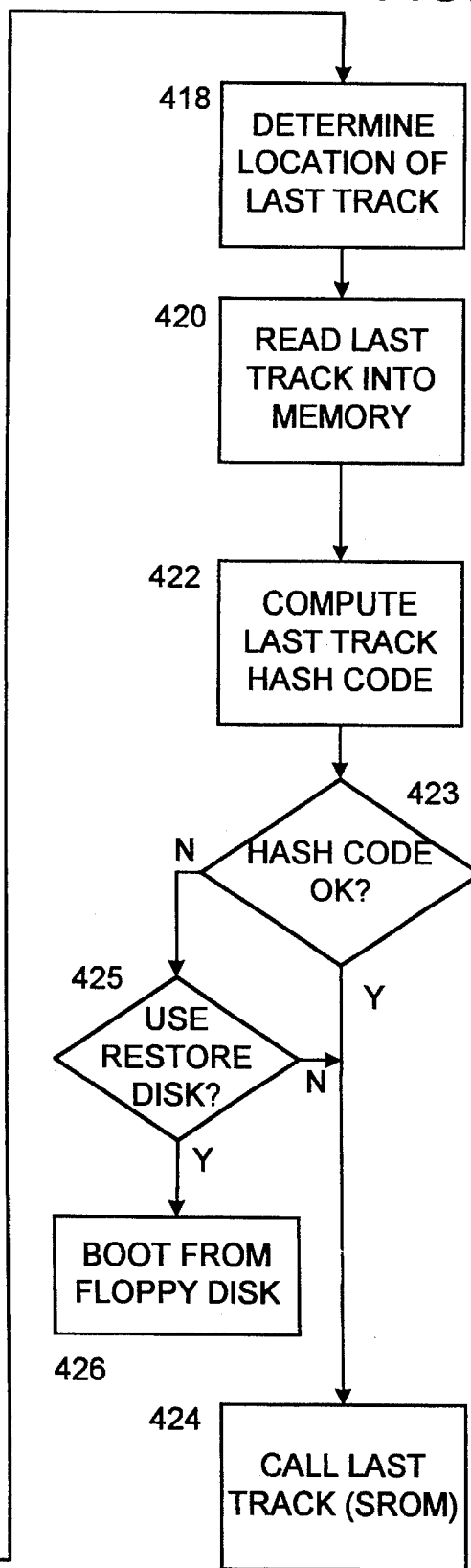

When power to computer system is initially turned on, or the system is cold reset, the power on sequence 400 (FIG. 4) is commenced. The first step of the power on sequence 400 is step 402 where the computer will start executing from BIOS ROM. The BIOS is preferably stored in flash ROM 154 and contains low level programming for booting the operating system, and an INT 13h handler for accessing the hard disk. Control then proceeds from step 402 to step 404 where the computer system performs a power on self test to determine if all system hardware is operating properly. Control then proceeds from step 404 to step 406 where an RROM routine begins and the computer system reads the NVRAM 148 to determine if the SAFE START routine should commence. If so, control proceeds to step 408 where the computer system determines if a hard disk is present. If in step 406 the system determines the SAFE START routine should not commence, then control proceeds to step 410 where the BIOS routine performs the remainder of the boot sequence. If in step 408, it was determined that the system did not have a hard disk present, control proceeds to step 410 where the BIOS routine performs the remainder of the boot sequence.

If the computer system does have a hard disk present, then control proceeds from step 408 to step 412 where the RROM routine contained in the flash ROM 154 is copied into the memory array 214 for faster processing. After RROM is copied, the computer jumps to the RROM starting address and begins executing. Control then proceeds to step 414 where the computer system reads the master boot record (MBR) from the hard drive. The master boot record contains a partition table indicating the type, location and size of each hard disk partition. Control then proceeds to step 416 where the computer system determines, from the master boot record, the location of a reserved non-DOS partition. The reserved non-DOS partition is identified by a partition type 12h. Control then proceeds to step 418 where the system determines the location of the last track in the reserved non-DOS partition. Control proceeds from step 418 to step 420 where the computer system reads the last track into the memory array 214. The last track of the reserved non-DOS partition contains an SROM routine, various support files, and hash codes for verifying that the system is free from viruses. Control then proceeds to step 422 where the computer system calculates an MDC or hash code of the last track. Numerous MDCs or hash codes could be utilized to perform this operation. Control then proceeds to step 423 where the computer system determines whether the last track has been modified by comparing the computed hash code with a value stored in NVRAM 148. If not so, the control proceeds to step 424 where the computer system jumps to the SROM starting address. If in step 423 the system determines that the last track has been modified, then control proceeds to step 425 where the computer system notifies the user of the possible infection and requests the user whether the last track should be restored. If not modified, control proceeds to step 424. If so requested, control proceeds to step 426 where the user inserts a floppy recovery disk and boots from the floppy disk.

Figure 5:
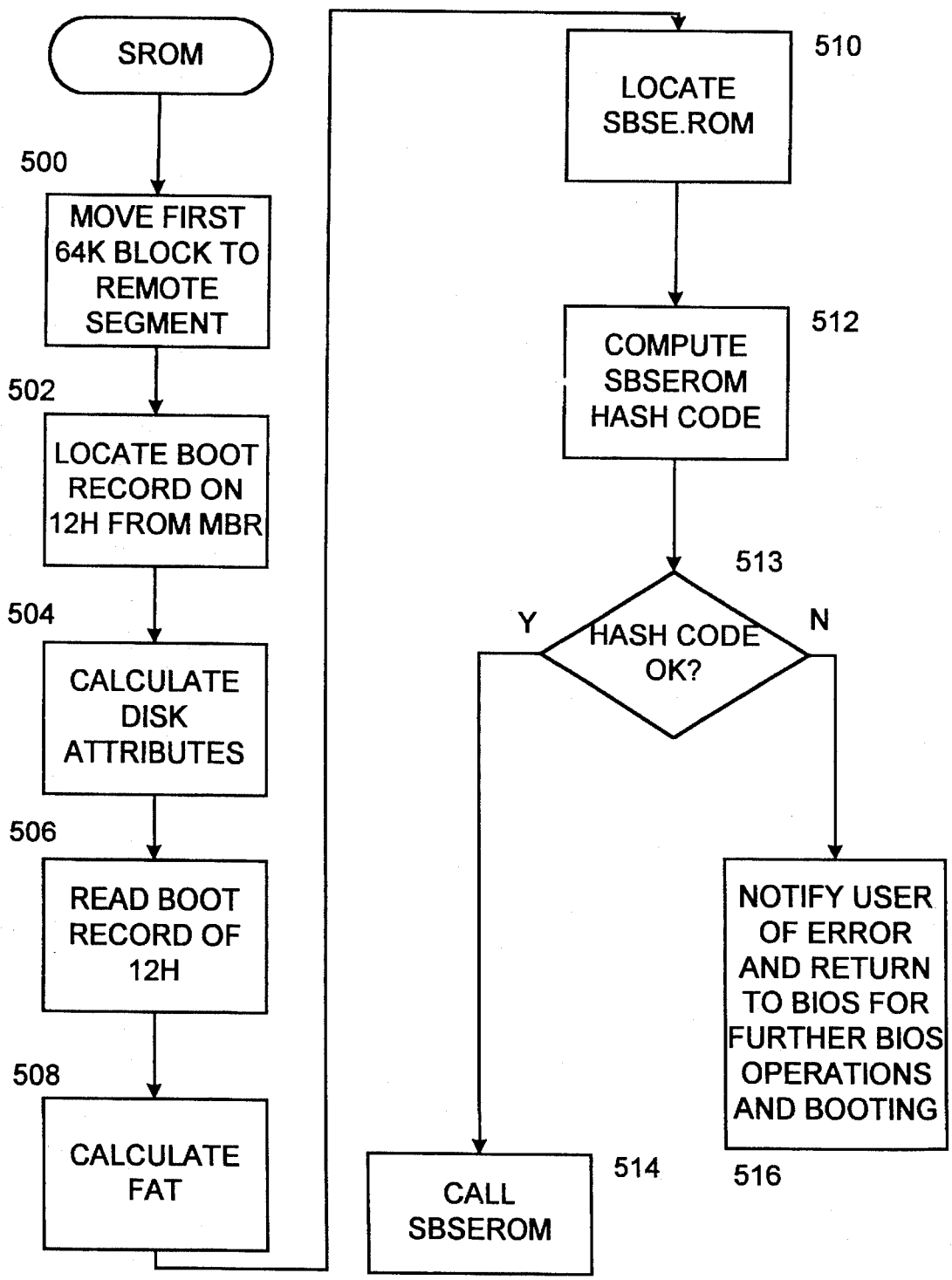
FIG. 5 is a flowchart for further illustrating sequences for preparing the computer system of FIGS. 1 and 2 for utilizing the present invention.

Control then proceeds from step 424 to step 500 (FIG. 5) where the SROM routine commences and the computer system saves the first 64 k block of the memory array 214 by moving it to a remote memory segment. As part of its boot sequence, the BIOS has stored values in the first 64 k of the memory array 214 that need to be preserved for later restoration so that when control is returned to the BIOS the values will be in the first 64 k of the memory array 214 as expected. Control then proceeds to step 502 where the computer locates the reserved non-DOS partition boot record. Control then proceeds from step 502 to step 504 where the computer system computes hard disk track, cylinder, head and sector information for retrieving data from the hard disk by an INT 13h call. Control then proceeds to step 506 where the computer system again reads the reserved non-DOS partition boot record. Control then proceeds from step 506 to step 508 where the computer system calculates the hard disk file allocation table and root structure. At this point, the computer system has enough information about the hard disk to make INT 13h calls to the BIOS. Control then proceeds to step 510 where the computer system locates the starting address and file size of an SBSEROM routine from within the last track previously stored in the memory array 214. Control then proceeds to step 512 where the computer system computes a hash code for the SBSEROM routine. Control then proceeds to step 513 where the computer system determines whether the SBSEROM routine has been modified by comparing the computed hash code with a value stored in the last track. If modified, control proceeds to step 516 where the computer system notifies the user of the possible virus infection and returns control to the BIOS for further BIOS operations and operating system boot. If in step 513 the system determines that the SBSEROM routine has not been modified, then control proceeds directly to step 514 where the computer system jumps to the SBSEROM routine starting address.

Figure 6A:
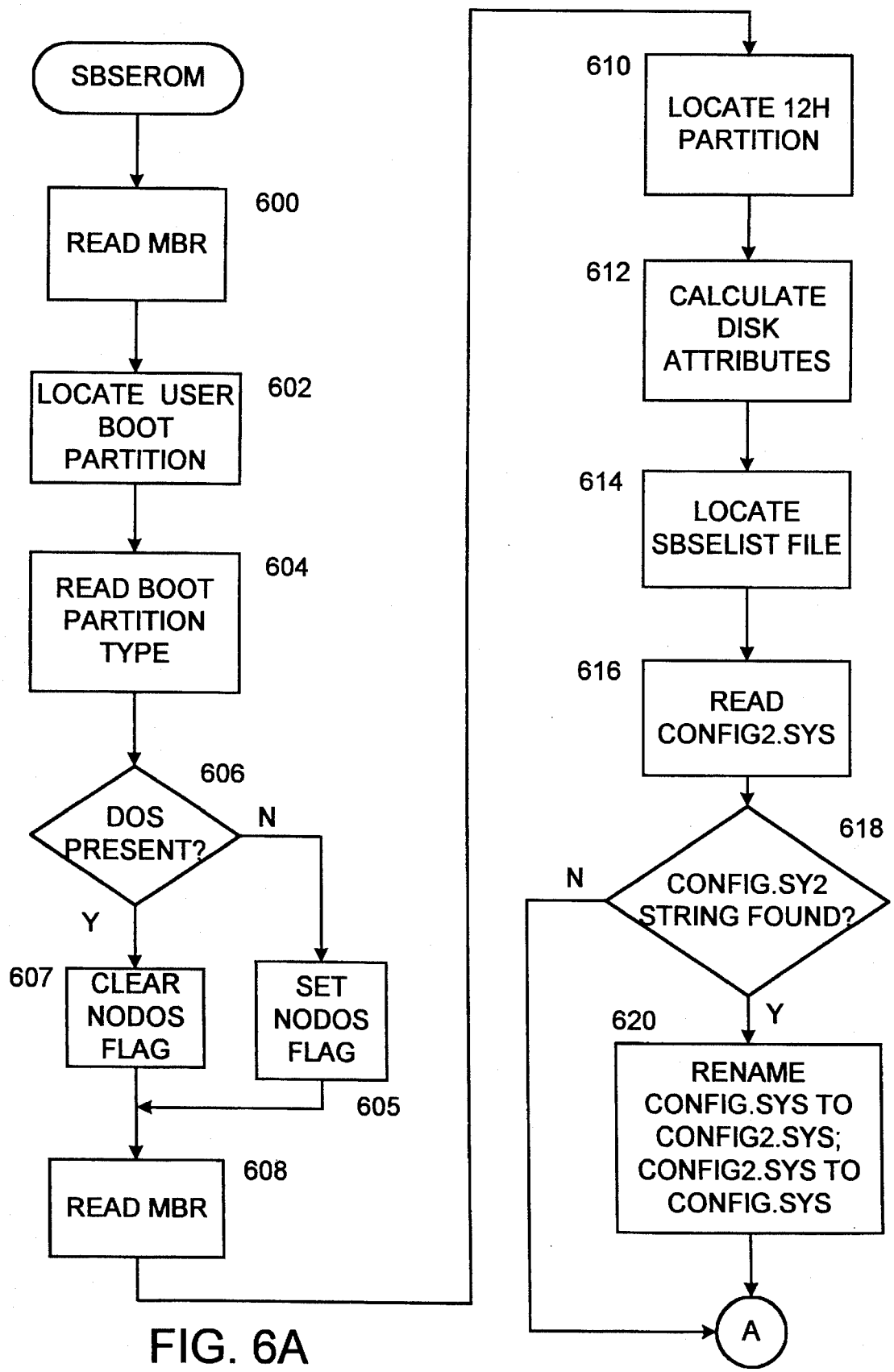
FIGS. 6A, 6B, 6C and 6D are flowcharts for further illustrating sequences for preparing the computer system of FIGS. 1 and 2 for utilizing the present invention.

Control then proceeds from step 514 to step 600 (FIG. 6A) where the SBSEROM routine commences and the computer system reads the master boot record off the hard disk. Control then proceeds to step 602 where the computer system locates the bootable partition of the hard disk from the master boot record. Control then proceeds to step 604 where the computer system reads the partition type information from the master boot record. The hard disk may contain various partitions of types: DOS, non-DOS and reserved. Control then proceeds to step 606 where the computer system determines if DOS is present on the boot partition of the hard drive. If not present, then a NODOS flag is set is set in step 605 and control proceeds to step 608. If present, the NODOS flag is cleared in step 607 and control proceeds to step 608 where the system again reads the master boot record. Control then proceeds to step 610 where the computer system locates the reserved non-DOS partition. A computer system incorporating the present invention would have a reserved non-DOS partition, also referred to as a 12h partition, and at least one other partition for the operating system and user data. Both the operating system partition and the reserved non-DOS partition are bootable partitions, however for clarity when referring to a boot sector or record, the reserved non-DOS 12h partition will be explicitly denoted as such and the common 6h boot partition will be referred to as the user partition.

Control proceeds from step 610 to step 612 where the computer system computes hard disk track, cylinder, head and sector information for retrieving data from the hard disk. Control then proceeds to step 614 where, on the reserved non-DOS partition, the computer system locates an SBSELIST.TXT file for future reference. The SBSELIST.TXT file contains a list of critical system files from the reserved non-DOS partition. Control then proceeds to step 616 where the computer system locates and reads a CONFIG2.SYS file from the hard disk. Control then proceeds from step 616 to step 618 where the computer system determines if string "config.sy2" is contained in a CONFIG2.SYS file. If so, control proceeds to step 620 where the computer system uses a temporary buffer for renaming the configuration files as follows: rename the CONFIG.SYS file to the CONFIG2.SYS file, and rename the CONFIG2.SYS file to the CONFIG.SYS file. If in step 618 the computer system determines that the files should not be renamed because the "config.sy2" string is not found, then control proceeds to step 622. Control proceeds from step 620 to step 622.

Figure 6B:
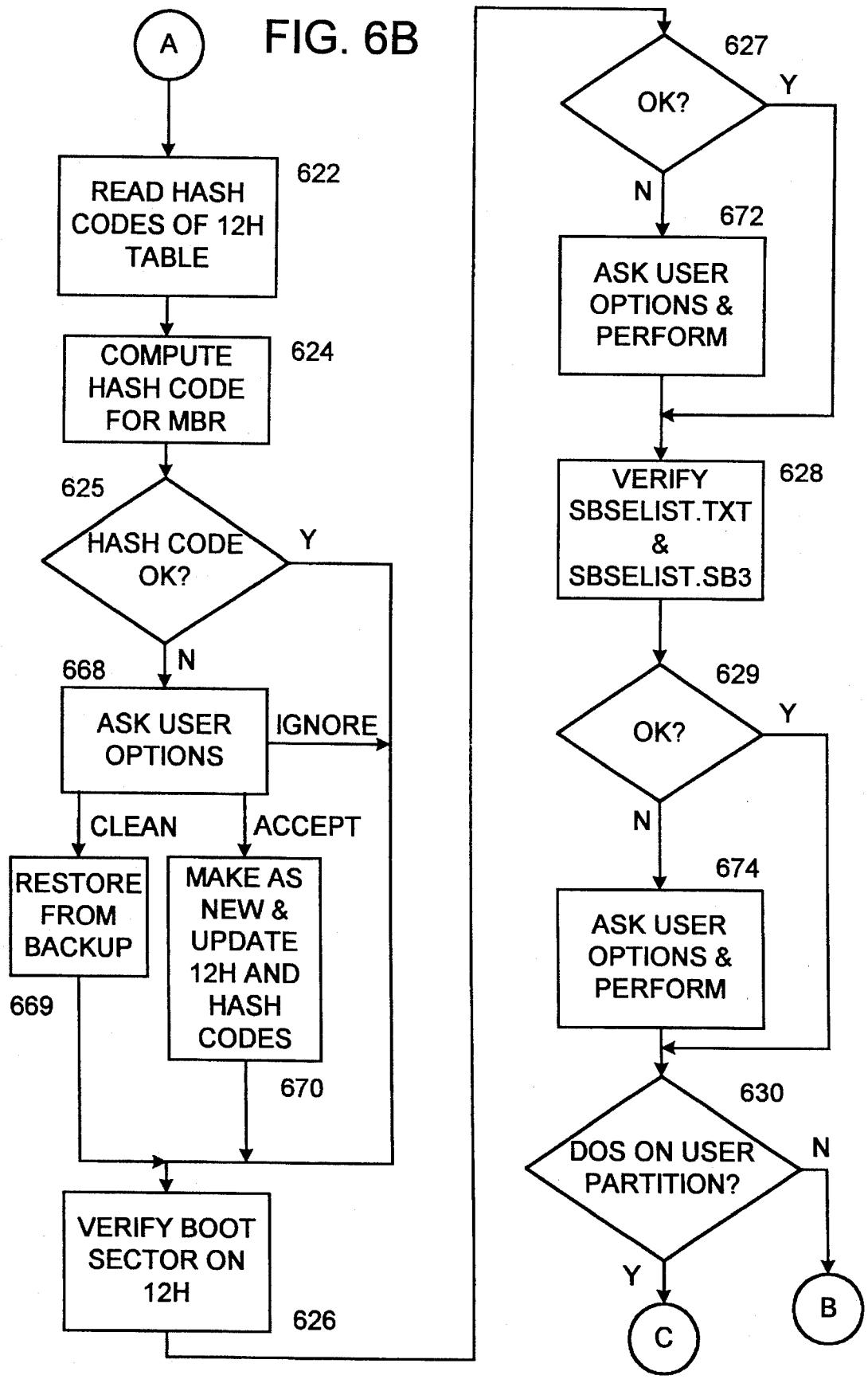

In step 622 (FIG. 6B) the computer system reads a hash code table, from the reserved non-DOS partition, for verifying files. Control then proceeds to step 624 where the computer system computes a hash code for the master boot record. Control then proceeds to step 625 where the computer system determines whether the master boot record has been modified by comparing the computed hash code with value from the hash code table. If modified, control proceeds to step 668 where the computer system notifies the user of the possible virus infection and requests an option to be performed. If the user chooses to ignore, control proceeds to step 626. If the user chooses to clear the master boot record, it is restored from the backup in step 669 and control proceeds to step 626. If the user chooses to accept the new master boot record, in step 670 the new master boot record is placed on the hard disk, and backup and hash codes are developed in a backwards fashion, for the master boot record, the hash code table and the NVRAM 148. Control then proceeds to step 626. If not modified in step 625, control proceeds to step 626 where the computer system computes a hash code for the reserved non-DOS partition's boot sector. Control then proceeds to step 627 where the computer system determines whether the reserved non-DOS boot sector has been modified by comparing the computed hash code with a value from the hash code table. If modified, control proceeds to step 672 where the computer system notifies the user of the possible virus infection, ask for options similar to steps 668–670 and proceeds to step 628. If not modified, control proceeds to step 628 where the computer system locates the SBSELIST.TXT files and SBSELIST.SB3 files and computes hash codes for each file. Control then proceeds to step 629 where the computer system determines whether either of the SBSELIST.TXT or SBSELIST.SB3 files has been modified by comparing each computed hash code with a value from the hash code table. If modified, control proceeds to step 674 where the computer system notifies the user of the possible virus infection, retains the identity of the modified data for later data recovery routines, and proceeds to step 630. If not modified, control proceeds from step 629 to step 630.

Figure 6C:
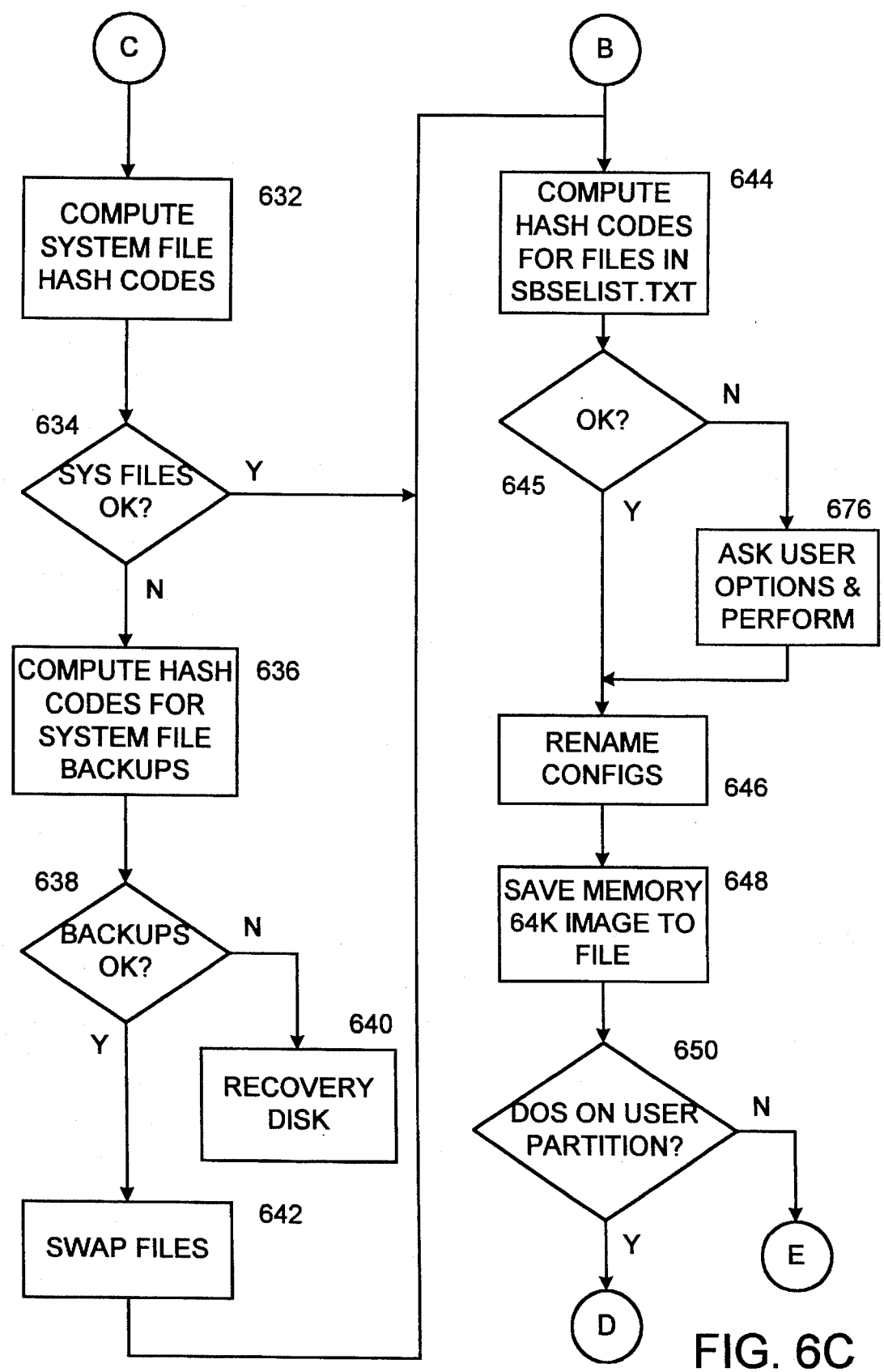

In step 630 the computer system determines whether DOS is installed on the user boot partition of the hard drive by searching for system files, namely, MSDOS.SYS and IO.SYS, or IBMDOS.COM and IBMIO.COM. If not found, control proceeds to step 644 (FIG. 6C). If the system files are found, control then proceeds to step 632 where the computer computes hash codes for the user system files. Control then proceeds to step 634 where the computer system determines whether the user system files have been modified by comparing each computed hash code with a value from the hash code table. If not modified, control proceeds to step 644. If the user system files have been modified, control proceeds to step 636 where the computer system computes hash codes for SDOS system file backups, namely, IO.SB3 and MSDOS.SB3. SDOS refers to a small DOS and is required for the SAFE START routines if the user DOS is damaged or not installed. Control then proceeds to step 638 where the computer system determines whether the SDOS system file backups have been modified by comparing each computed hash code with a value from the hash code table. If modified, then control proceeds to step 640 where a disk recovery routine commences as now the system files and their backups do not verify, so recovery must be done from an external source. If the backups have not been modified, control proceeds to step 642 where the verified SDOS system file backups are restored to the reserved non-DOS partition boot sector. Control then proceeds to step 644.

In step 644 the computer system computes hash codes for the files listed in the SBSELIST.TXT file. This is done by reading each listed file and determining its hash code. Control then proceeds to step 645 where the computer system determines whether each file listed in the SBSELIST.TXT file has been modified by comparing each computed hash code to a value from the hash code table. If modified, then control proceeds to step 676 where the computer system notifies the user of the possible virus infection, asks for options, performs the selected option and proceeds to step 646. If not modified, control then proceeds directly to step 646 where the reserved non-DOS partition configuration files are renamed as follows: rename the CONFIG2.SYS file to the CONFIG.SYS file, and rename the CONFIG.SYS file to the CONFIG2.SYS file. Control then proceeds to step 648 where the computer system saves the 64 k block of BIOS data previously relocated in the memory array 214 to a file on the hard disk.

Figure 6D:
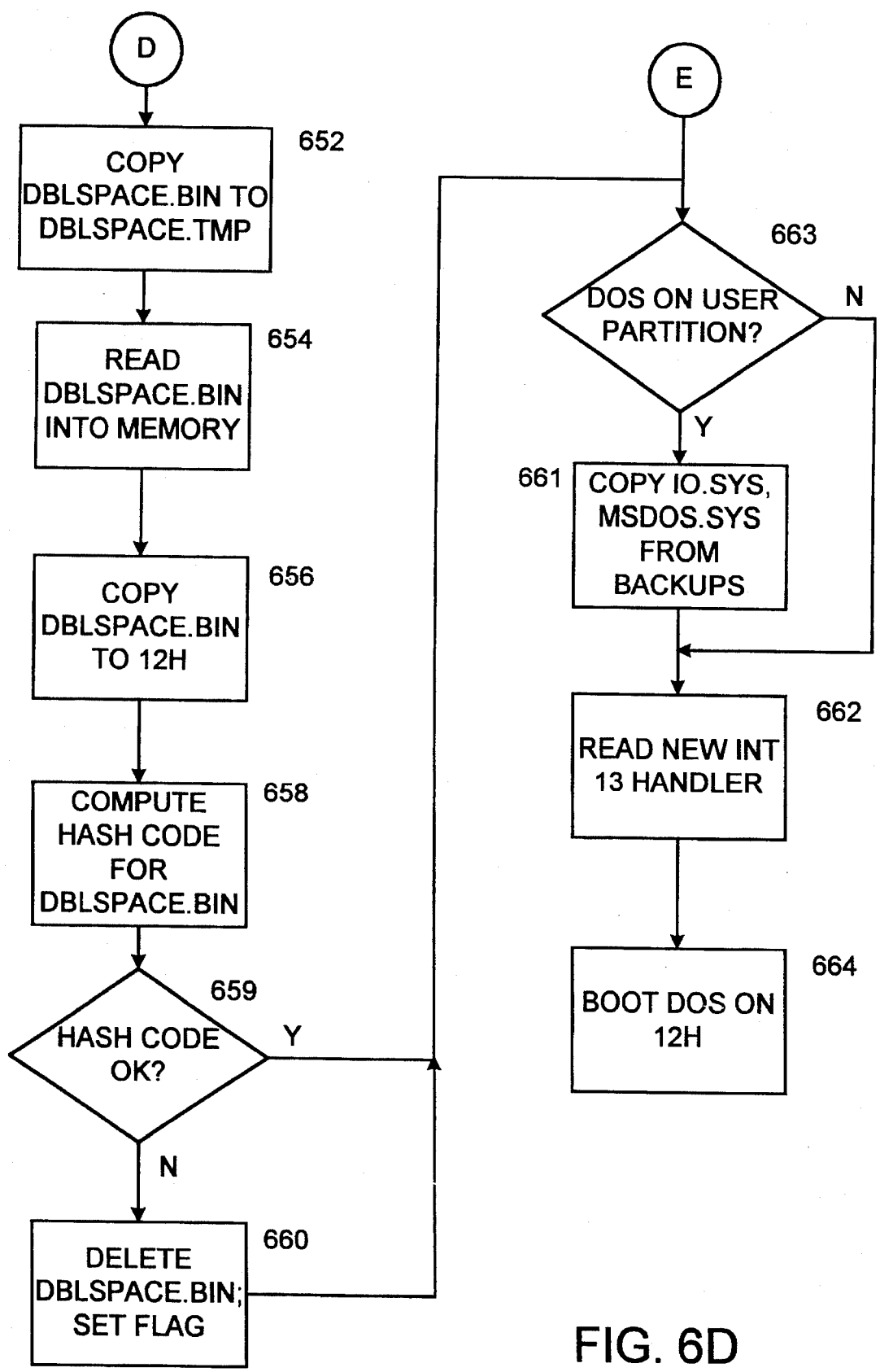

After saving the memory image, control proceeds to step 650 where the computer system determines whether DOS is present on the user boot partition. If not, then control proceeds to step 663 (FIG. 6D). If DOS is present, then control proceeds to step 652 where, on the reserved non-DOS partition, the computer system locates and copies a DBLSPACE.BIN file to a DBLSPACE.TMP file. Control then proceeds to step 654 where, on the user partition, the computer system locates and reads the DBLSPACE.BIN file into the memory array 214. Control then proceeds to step 656 where, on the reserved non-DOS partition, the computer system writes the DBLSPACE.BIN file from memory array 214 to the reserved non-DOS partition. Control then proceeds to step 658 where the computer system computes a hash code for the DBLSPACE.BIN file. Control then proceeds to step 659 where the computer system determines whether the DBLSPACE.BIN file has been modified by comparing the computed hash code with a value from the hash code table. If modified, control proceeds to step 660 where the computer system retains the identity of the modified data for later data recovery routines, deletes the DBLSPACE.BIN file on the non-DOS partition and proceeds to step 663 where the presence of DOS is again checked. If not present, control proceeds to step 662. If present, control proceeds to step 661 where, on the reserved non-DOS partition, the computer system restores SDOS system files IO.SYS and MSDOS.SYS from backups IO.SB3 and MSDOS.SB3. Control then proceeds to step 662 where the computer system replaces the INT 13*h* vector with a new vector pointing to a modified INT 13*h* handler for trapping on read operations to the master boot record by a SAFESTRT.EXE routine. By trapping on a read to the master boot record with a read command valve of 82*h* rather than 02*h* as normal, the new INT 13*h* handler can modify the data buffer containing the master boot record partition table so that the computer system boots DOS from the reserved non-DOS partition. A read to the master boot record will normally report that the reserved non-DOS partition is of type 12*h* in which case DOS cannot boot from the 12*h* partition and that another partition is bootable. However with the modified INT 13*h* installed, the master boot record valve provided to DOS is modified to indicate the bootable partition is not bootable and to indicate that the 12*h* non-DOS partition is both a type 6 DOS partition and is bootable. Thus, with the INT 13*h* handler installed, DOS will receive a 6*h* (DOS type) and will therefore boot. By using the 82*h* read command the SAFESTRT routine can still read the master boot record in an unmodified form. Control then proceeds to step 664 where the computer system jumps to an address where DOS boots from the reserved non-DOS partition and loads a CONFIG.SYS device driver called SAFESTRT.EXE.

Figure 7A:
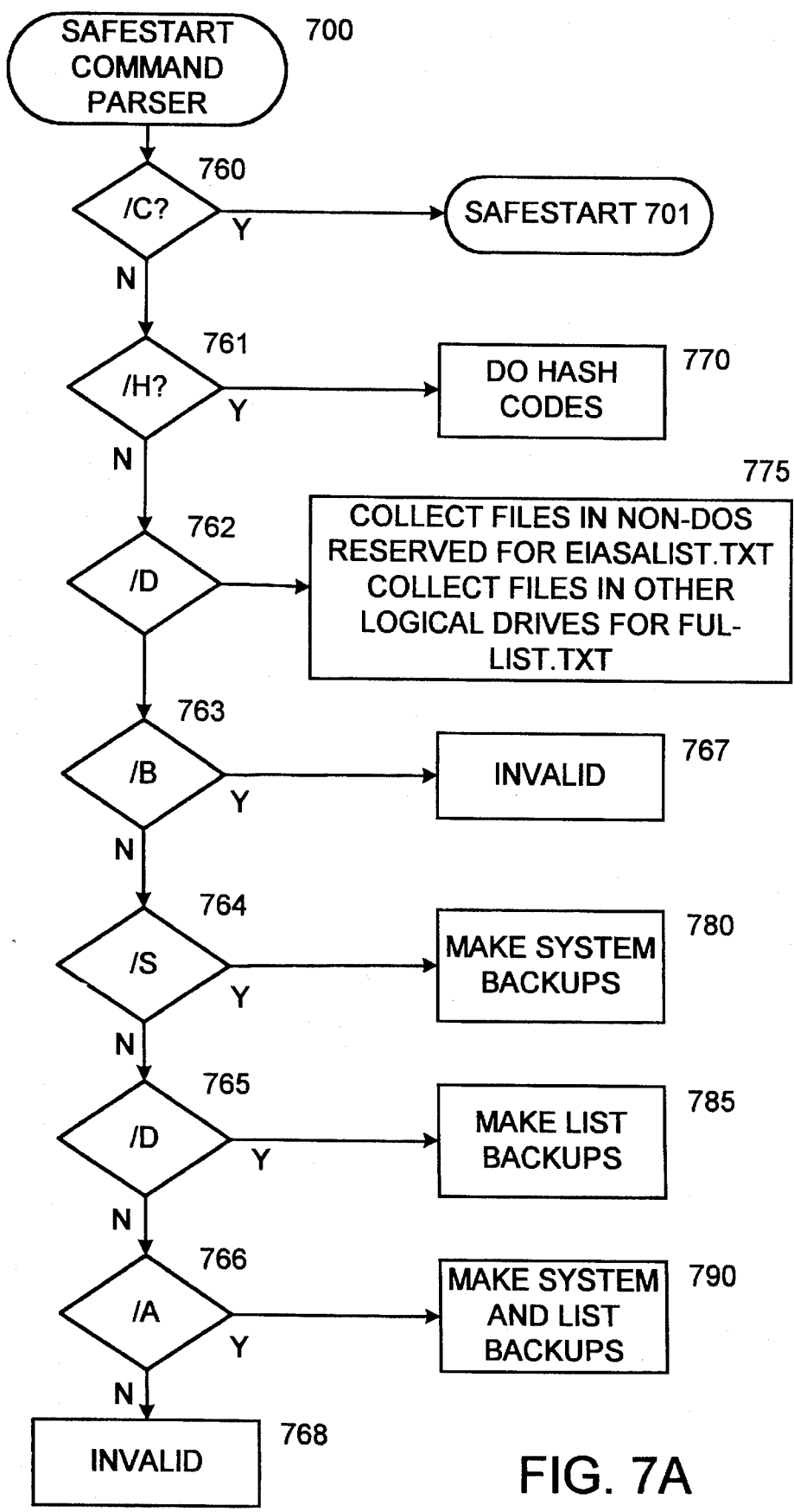
FIGS. 7A, 7B, 7C and 7D are flowcharts for further illustrating sequences for preparing the computer system of FIGS. 1 and 2 for utilizing the present invention.

Control proceeds to step 700 (FIG. 7A) where the SAFESTRT command parser begins a process to determine which subroutine to execute. Control proceeds from step 700 to step 760 where the computer system determines if a /C is present on the command line. If not, control proceeds to step 761 where the computer system determines if a /H is present on the command line. If not, control proceeds to step 762 where the computer system determines if a /D is present on the command line. If not, control proceeds to step 763 where the computer system determines if a /B is present on the command line. If not, control proceeds to step 767 where the computer system reports an invalid command option. If the /B option is present, control proceeds to step 764 where the computer system determines if a /S is also present on the command line. If not, control proceeds to step 765 where the computer system determines if a /D is present on the command line. If not, control proceeds to step 766 where the computer system determines if a /A is present on the command line. If not, control proceeds to step 768 where the computer system reports an invalid command option. If in step 760 the computer determines that a /C is present, control proceeds to step 701 where the SAFESTRT subroutine 701 is run. This option is the one used during normal booting of the computer system, the other alternatives used by utility programs for management functions, such as adding or deleting files to be checked. If in step 761 the computer determines that a /H is present, control proceeds to step 770 where the computer system first computes hash codes for files listed in the SBSELIST.TXT, FUL-LIST.TXT (if DOS on user partition) and EISALIST.TXT files and second computes hash codes for the three files themselves and copies the newly computed hash codes into the hash code table on the reserved non-DOS partition. The hash code of the last track of the non-DOS partition is then computed and placed in the NVRAM 148. If in step 762 the computer determines that a /D is present, control proceeds to step 775 where the computer system collects file names from the reserved non-DOS partition with certain file extensions and places the file names in file SBSELIST.TXT, collects EISA configuration file names from the reserved non-DOS partition and places the file names in file EISALIST.TXT, and if DOS is present on the user partition, collects file names from the DOS partitions and places the file names in file FUL-LIST.TXT. If in step 764 the computer determines that a /S is present, control proceeds to step 780 where, on the reserved non-DOS partition, the computer system makes backups (*.SBK's) of the master boot record, the boot record, and the SBSELIST.TXT, FUL-LIST.TXT and EISALIST.TXT files and places those backups on the reserved non-DOS partition, and on the user partition, the computer system makes backups of the boot record and, if DOS is installed, backups of the system files and places these on the user partition. If in step 765 the computer determines that a /D is present, control proceeds to step 785 where the computer system makes backups of the file listed in the FUL-LIST.TXT and EISALIST.TXT files and places these backups on the user partition. If in step 766 the computer determines that a /A is present, control proceeds to step 790 where the operations performed in steps 780 and 785 are both performed.

Figure 7B:
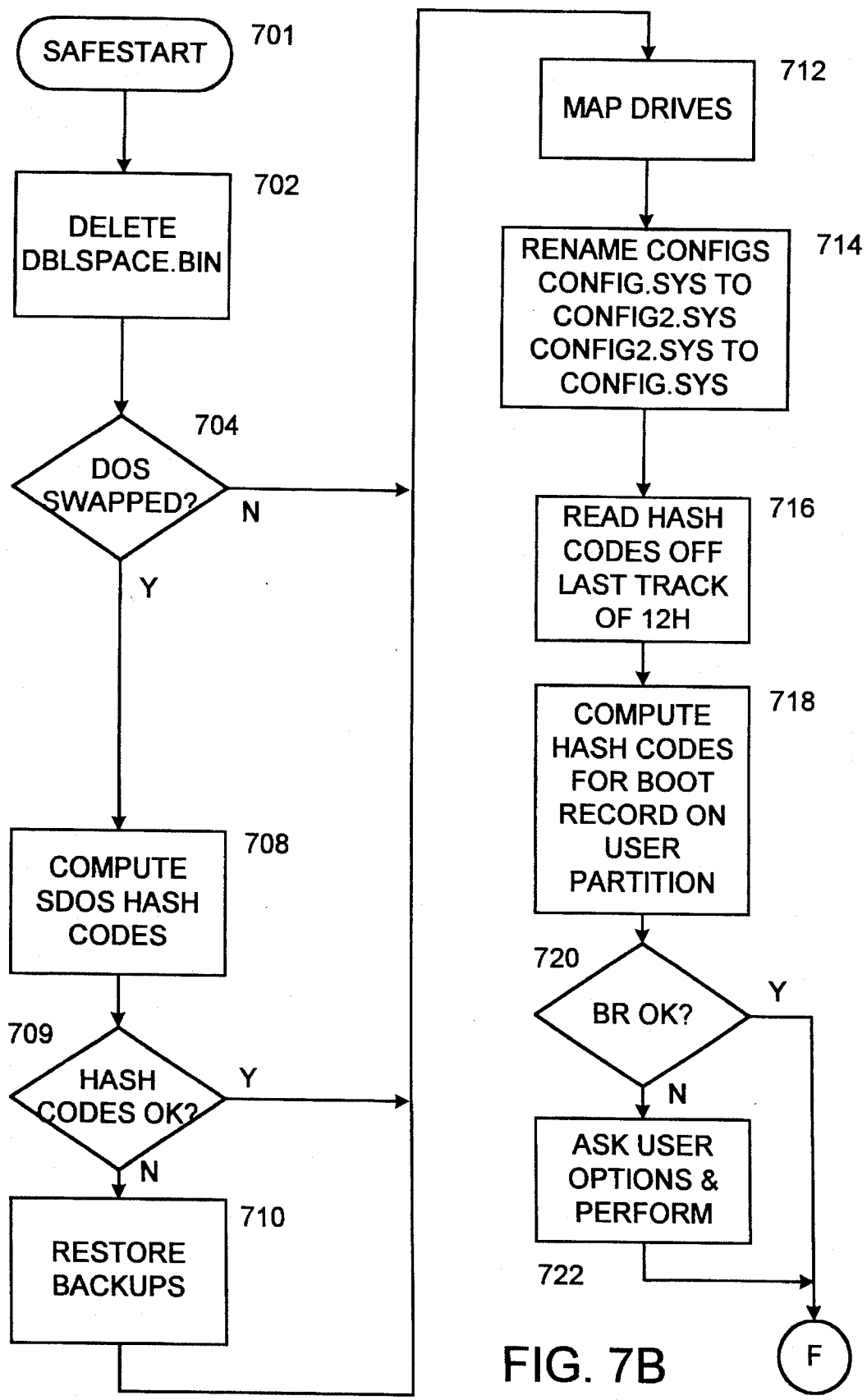

Assuming a normal booting process, control proceeds from step 760 to step 701 (FIG. 7B) where the SAFESTRT subroutine commences. Control proceeds from step 701 to step 702 where, on the reserved non-DOS partition, the computer system deletes the DBLSPACE.BIN file. Control then proceeds to step 704 where the computer system determines whether SDOS was earlier swapped into the reserved non-DOS partition. If not, control proceeds to step 712. If SDOS was swapped, the control proceeds to step 708 where the computer system computes hash codes for the SDOS system file backups. Control then proceeds to step 709 where the computer system determines whether the SDOS system file backups have been modified by comparing each computed hash code with a value stored in the hash code table. If the computer system determines that the SDOS backups have been modified, control proceeds to step 712. If the computer system determines that the SDOS system file backups have not been modified, then control proceeds to step 710 where, on the reserved non-DOS partition, the computer system restores the SDOS system file backups.

Control then proceeds from step 710 to step 712 where the computer system creates a map of the logical disk drives. While operating from the reserved non-DOS partition DOS, the former user DOS partitions, normal and extended, must be logically rearranged because DOS was booted from the reserved non-DOS partition which now occupies the first logical address of drive C:. In the remapping process the last drive in the physical drive and partition list of DOS partitions becomes the second logical hard drive (D:) and each remaining partition increases logical position by two from normal, from D: to F:, E: to G: and so on, until this process has been done for the next to the last drive. The last drive has already been assigned as the second logical drive D:. The increment by two covers the addition of the non-DOS partition as logical drive C: and the relocation of the last partition to logical drive D:. If the computer has only the single bootable DOS partition which is normally logical drive C:, that partition becomes logical drive D:, with the non-DOS partition treated as logical drive C: as it is indicated as the bootable DOS partition. If the computer normally has two partitions, the first bootable DOS and the second an extended DOS, for example, which would normally be logical drives C: and D:, they now become logical drives E: and D:, respectively. In a three partition case, normal logical drives C:, D:, and E:, are remapped to be logical drives E:, F:, and D:, respectively. This remapping conforms to that done by DOS when two primary DOS partitions are present. Control then proceeds to step 714 where the computer system renames the configuration files as follows: rename the CONFIG.SYS file to be the CONFIG2.SYS file and rename the CONFIG2.SYS file to be the CONFIG.SYS file. Control then proceeds to step 716 where the computer system reads a hash code table from the last track of the reserved non-DOS partition into the memory array 214. Control then proceeds to step 718 where, on the user partition, the computer system computes a hash code for the boot record. Control then proceeds to step 720 where the computer system determines if the boot record has been modified by comparing the computed hash code to a value from the hash code table. If modified, the computer system notifies the user of the possible virus infection, retains the identity of the modified data, and control proceeds to step 722 where the possible virus infection is displayed to the user, options are presented as described above and the selected option is performed. Control proceeds to step 724. If the user has installed a new version of DOS this check finds the new boot record, so the user need only accept the change and the new DOS version boot record will be maintained. If the boot record was not modified in step 720, then control proceeds to step 724.

Figure 7C:
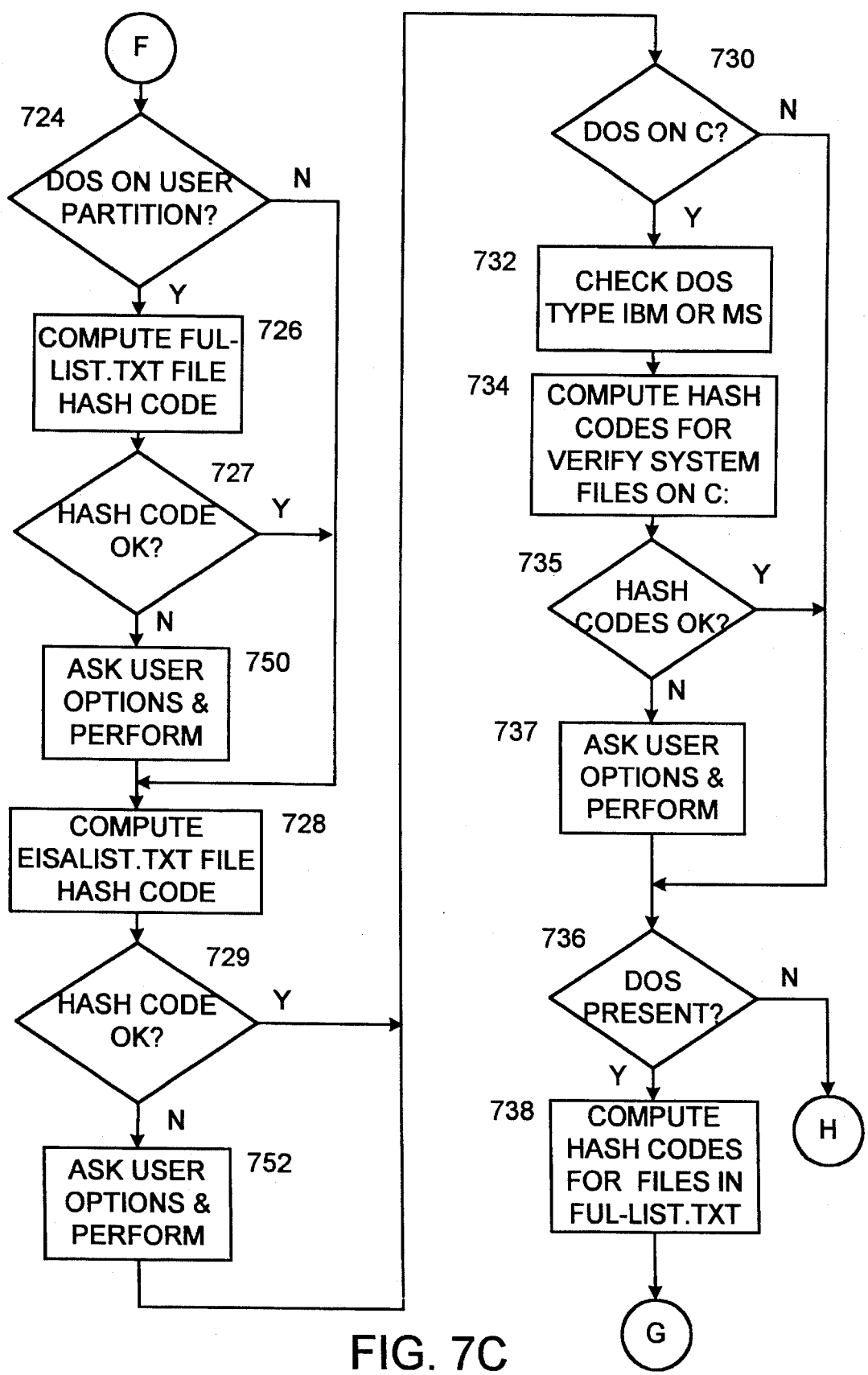

In step 724 (FIG. 7C), the computer system again determines whether DOS is present on the user partition of the hard disk. If not present, then control proceeds to step 728. If DOS is present, then control proceeds to step 726 where the computer system locates the FUL-LIST.TXT file and computes a hash code of the file. Control then proceeds to step 727 where the computer system determines whether the FUL-LIST.TXT file has been modified by comparing the computed hash code with a value stored in the hash code table. If modified, in step 750 the possible problem is presented to the user, options are presented, the selected option is performed and then control proceeds to step 728. If the FUL-LIST.TXT file has not been modified, then control proceeds to step 728 where the computer system locates the EISALIST.TXT file and computes a hash code. Control then proceeds to step 729 where the computer system determines whether the EISALIST.TXT file has been modified by comparing the computed hash code with a value stored in the hash code table. If modified, in step 752 the user is notified of the problem and options and the selected option is performed and control proceeds to step 730. If the EISALIST.TXT file has not been modified, then control proceeds to step 730 where the computer system determines again whether DOS is installed on the user partition of the hard disk. If not installed, then control proceeds to step 736.

If DOS is installed, then control proceeds to step 732 where, on the user partition, the computer system determines whether the DOS type is IBMDOS or MSDOS. Control then proceeds to step 734 where, on the user partition, the computer system computes a hash code for the DOS system files. Control then proceeds to step 735 where the computer system determines whether the DOS system files have been modified by comparing the computed hash codes with values stored in the hash code table. If modified, in step 737 the computer system notifies the user of the possible virus infection, presents options and performs them and proceeds to step 736. This step 737 is where the user updates the stored files if he has installed a new DOS version by simply accepting the changes. Thus a change in the DOS version is simply handled on the next power up of the computer system. If the DOS system files have not been modified, then control proceeds to step 736 where, on the user partition, the computer system again determines whether DOS is installed. If not installed, control proceeds to step 740. If DOS is installed, then control proceeds to step 738 where the computer system computes a hash code for each of the files listed in the FUL-LIST.TXT file. The FUL-LIST.TXT file contains a list of files to be verified from the user DOS partitions and extended DOS partitions.

Figure 7D:
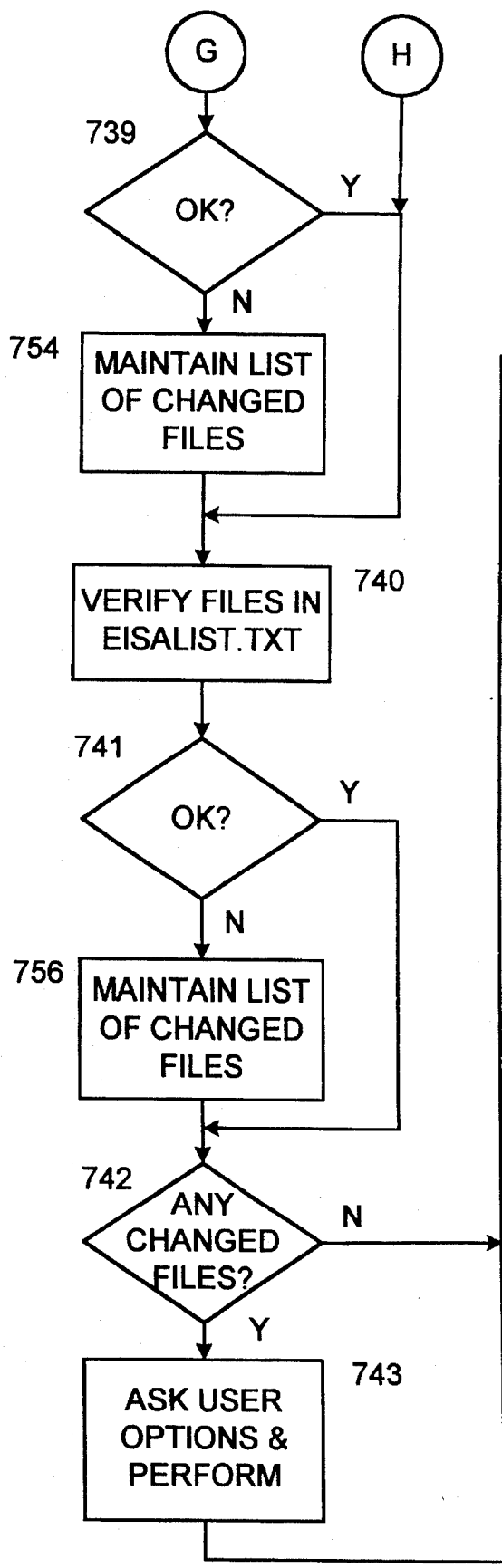

Control then proceeds to step 739 (FIG. 7D) where the computer system determines whether each file listed in FUL-LIST.TXT has been modified by comparing each computed hash code with a value stored in FUL-LIST.TXT. If modified, control proceeds to step 754 where the computer system maintains a list of the changed files and control proceeds to step 740. If no files have been modified, control proceeds from step 739 to step 740 where the computer system computes a hash code for each file listed in EISALIST.TXT. Control then proceeds to step 741 where the computer system determines whether each file listed in EISALIST.TXT has been modified by comparing each computed hash code with a value stored in EISALIST.TXT. If modified, control proceeds to step 756 where the computer system maintains a list of the changed files and control proceeds to step 742. If no files have been modified, control proceeds from step 741 to step 742. In step 742, the computer determines if any files have been changed, using the maintained lists. If not, control proceeds to step 744. If so, control proceeds to step 743 where the user is informed of the changed files, presented with options for each file and the selected options are performed. Control then proceeds to step 744.

In step 744 the computer system sets a write protect request bit for use by the BIOS. This indicates that the detection has been completed and the NVRAM 148 can be write protected. It is not write protected at this time in the preferred embodiment because other functions, such as passwords and system hardware configuration are also controlled by the write protection and as the BIOS may still have to perform these functions, only a request is provided. Control then proceeds to step 745 where the computer system restores the 64 k block of BIOS data to the first 64 k segment in Memory Array 214. This restoration also overwrites the replaced INT 13h vector, so the changed INT 13h code is automatically removed. Control then proceeds to step 746 where the computer system returns control back to the BIOS. In step 748 the BIOS performs other functions, such as option ROM checking and other POST activities. Ultimately, in step 750 the BIOS closes the write protection bit in the NVRAM 148 based on the write protection request bit being set and all other activities completed. This secures the hash code continued in the NVRAM 148. Control then proceeds to step 752 where the normal boot procedure in an INT 19h call is performed.

It was noted that an RROM sequence was started in the BIOS at step 406. In the preferred embodiment, the RROM sequence is configured as an option ROM and located in the option ROM space as conventional in a PC, preferably as the last option ROM to allow any prior option ROMs to be installed. Thus the BIOS executes the RROM sequence as a part of its scan for option ROMs, which are executed when found, in POST. This arrangement requires providing address decoding for the RROM sequence, but also simplifies distribution into a family of products. The RROM sequence could have been implemented as a direct call from the BIOS, rather than an option ROM call, if desired.

Thus a system according to the present invention performs all virus detection checks before the computer system is booted for user operations. By using this preliminary boot procedure from a non-DOS and thus not accessible partition, and properly maintaining a secure user DOS copy, if the original DOS is not used, compatibility is maintained and management is kept at a minimum. The user cannot inadvertently delete or alter the detection software and its preliminary boot path. Nor can a virus access the partition. It is also noted that the technique allows checking of key portions of a non-DOS system, such as the EISA configuration files, the master boot record and the boot record.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for operating a computer system, the computer system including a processor; random access memory; read only memory containing a ROM program executed by said processor upon resetting of the computer system; at least one storage means having a non-DOS partition and at least one other partition, said non-DOS partition having a first and second region, said first region for storing a first verification program executed by said processor, a first verification list for storing a list of files stored on said second region, said files including files required to boot the computer system and a second verification program, and a first hash code table for storing hash codes of said first verification list files, said second region for storing a first operating system and the second verification program executed by said processor, a second verification list for storing a list of files stored on said other partitions and a second hash code table, said other partitions include at least a second partition for storing a second operating system and user programs executed by said processor; and a non-volatile memory having a plurality of locations for storing an non-volatile memory hash code and accessible to said processor, said non-volatile memory hash code containing at least one value being a modification detection code of said first region, said plurality of locations of said non-volatile memory being readable and writable by said processor after a first reset of the computer system, being write protected after receipt of a designated signal from said processor, and being made writable again only after a second reset of the computer system, the method comprising the steps of:

resetting the computer system and executing said ROM program, whereupon the ROM program causes execution of the following steps:

computing a hash code for said first region of said non-DOS partition;

determining if said computed hash code is equal to said non-volatile memory hash code value stored in said non-volatile memory;

loading said first verification program stored on said non-DOS partition into said random access memory if said computed hash code is equal; and executing said first verification program loaded into said random access memory; and wherein said first verification program further causes execution of the following steps:

computing hash codes for files listed in said first verification list;

determining if said computed hash codes are equal to hash code values stored in said first hash code table; and booting said first operating system on said non-DOS partition if said computed hash codes are equal; and wherein said operating system further causes execution of the following steps upon booting:

loading said second verification program stored on said non-DOS partition into said random access memory; and executing said second verification program loaded into said random access memory; and wherein said second verification program further causes execution of the following steps:

computing hash codes for files listed in said second verification list;

determining if said computed hash codes are equal to ash code values stored in said second hash code table; and returning control to said ROM program; and whereupon the ROM program causes further execution of the following steps if said computed hash codes are equal:

providing said designated signal to said non-volatile memory device prior to booting said second operating system; and booting said second operating system from said second partition.

2. The method of claim 1, wherein said storage means further includes a master boot record for containing a partition table, said non-DOS partition having a boot sector containing instructions for booting said first operating system and whereupon said first verification program further causes execution of the following steps prior to said booting said first operating system step:

computing hash codes for said master boot record and said non-DOS partition boot sector; and determining if said hash codes are equal to hash code values stored in said first hash code table.

3. The method of claim 2, wherein the at least one other partition includes at least one DOS accessible partition, whereupon said second verification program further causes execution of the following steps prior to computing hash codes for files listed in said second verification list:

determining each DOS accessible partition of said storage means;

assigning said non-DOS partition to a logical drive address value;

assigning a last partition of said DOS accessible partitions to a first logical drive address value after said non-DOS partition;

assigning a first partition of said DOS accessible partitions to a second logical drive address value after said non-DOS partition; and assigning the remaining partitions of said DOS accessible partition with logical drive address values sequentially incremented from said second logical drive address.

4. The method of claim 2, wherein said non-DOS partition includes system files of said second operating system, and backups of said system files of said first and second operating systems, whereupon said first verification program further causes execution of the following steps prior to said booting said first operating system step:

determining if system files from said second operating system are present on said second partition;

verifying said system files of said second operating system stored on said non-DOS partition if said system files of said second operating system are present on said second partition; and copying said system file backups of said first operating system stored on said non-DOS partition to said system files of said first operating system on said non-DOS partition if said system files of said second operating system are not present on said second partition.

5. The method of claim 4, whereupon said verifying step further causes execution of the following steps:

locating said system files of said second operating system stored on said non-DOS partition;

computing hash codes for said system files; and determining if said computed hash codes are equal to hash code values stored in said first hash code table.

6. The method of claim 4, whereupon said verifying step further causes execution of the following step prior to copying said system file backups:

verifying said system file backups of said second operating system stored on said non-DOS partition if said hash codes are not equal.

7. The method of claim 6, whereupon said verifying system file backups step further causes execution of the following steps:

computing hash codes for said system file backups of said second operating system stored on said non-DOS partition;

determining if said computed hash codes are equal to hash code values stored in said first hash code table; and restoring said system files of said second operating system to said non-DOS partition from an external source if said hash codes are not equal.

8. The method of claim 4, wherein said second partition includes a storage compression utility, and whereupon said first verification program further causes execution of the following steps prior to said booting said first operating system step:

copying said storage compression utility from said second partition to said non-DOS partition;

computing a hash code for said storage compression utility;

determining if said computed hash code is equal to a hash code value stored in said first hash code table; and deleting said storage compression utility copy from said non-DOS partition if said hash codes are not equal.

9. The method of claim 8, wherein said second partition includes a boot record for booting said second operating system, whereupon said second verification program further causes execution of the following steps prior to said returning control to said ROM program step:

computing a hash code for said second partition boot record; and determining if said computed hash code is equal to a hash code value stored in said second hash code table.

10. The method of claim 1, wherein said first verification program further causes execution of the following step prior to computing hash code values for files listed in said first verification list:

saving a lower region of said random access memory, said lower region containing ROM status information; and wherein said second verification program further causes execution of the following step just prior to returning control to said ROM program:

restoring said lower region of said random access memory.

11. The method of claim 1, wherein said first and second operating systems are DOS.

12. The method of claim 11, wherein said second verification list includes a system configuration files portion and a user files portion.

13. The method of claim 1, wherein said first operating system is DOS and said second operating system is other than DOS.

14. The method of claim 13, wherein said second verification list includes only system configuration files.

* * * * *

UNITED STATES PATENT AND TRADEMARK OFFICE
CERTIFICATE OF CORRECTION

PATENT NO.  : 5,537,540
DATED       : 07/16/96
INVENTOR(S) : Craig A. Miller, Yatin Dhareshwar, Edmund G. Heller
              Michael R. Garrett It is certified that error appears in the above-identified patent and that said Letters Patent is hereby corrected as shown below:

In claim 1, column 2, line 42, change "ash" to —hash—.

Signed and Sealed this

Twenty-second Day of October, 1996

Attest:

BRUCE LEHMAN

Attesting Officer            Commissioner of Patents and Trademarks